SYSTEM AND APPARATUS FOR SUPERIMPOSING VOICE-TIME MESSAGES ON SIGNAL RECORDINGS

Filed April 28, 1958

INVENTORS.
JOHN O. CAMPBELL,
YEE J. LIU,
BY
Harold L Jackson
ATTORNEY 2,966,552
Patented Dec. 27, 1960

2,966,552

SYSTEM AND APPARATUS FOR SUPERIMPOSING VOICE-TIME MESSAGES ON SIGNAL RECORDINGS

John O. Campbell and Yee J. Liu, Los Angeles, Calif., assignors to Aerosystronics Corporation, a corporation of California Filed Apr. 28, 1958, Ser. No. 731,416
7 Claims. (Cl. 179—6)

The present invention relates to a recording system, and more particularly, to a system and apparatus for superimposing timing signals on recordings of current events.

Such systems are used extensively in air traffic control centers where it is necessary to record all conversations between the ground controller and the pilot or an intermediate party so that a record is available in the event of a controversy or mishap, or for some other reason. In the past, tones have been periodically superimposed on these recordings to serve as aids in identifying the time of occurrence of particular portions of the conversations. However, these tones are automatically recorded on the sound recording whether a conversation is taking place or not, and tones which occur simultaneously with portions of a conversation may obscure that portion of the conversation sometimes making it difficult when the record is played back to determine exactly what was said.

It is an object of the present invention to provide a system and apparatus for injecting signals representative of the time on a recording of current events when such events are not taking place to prevent the timing message from obscuring any portion of the recorded event.

It is another object of the present invention to provide an improved system and apparatus for alternately recording voice-time messages representative of preselected current events on a reproducible sound record to facilitate the identification of the time of occurrence of the events, or any portion thereof.

In accordance with the present invention, a system and apparatus is provided for superimposing voice-time messages on signal recordings, which include a recording of voice messages stating predetermined times. Means including a playback mechanism are provided for reading out the recorded messages at preselected times so that the voice-time messages read out of the record correspond to the real time. Recording means are also provided for recording desired signals representative of events or conversations. Input signal means are coupled to the recording means for applying conversation or other signals thereto. Detecting means are also connected to the input signal means for sensing the presence of the input signals. Gating means under the control of the detecting means are connected between the playback mechanism and the recording means for controlling this application of the signals developed in the playback mechanism to the recording means in the absence of any input signals, whereby the voice-time messages indicative of the time of occurrence of the recorded input signals will be recorded only when no input signals are present.

Figure 1:
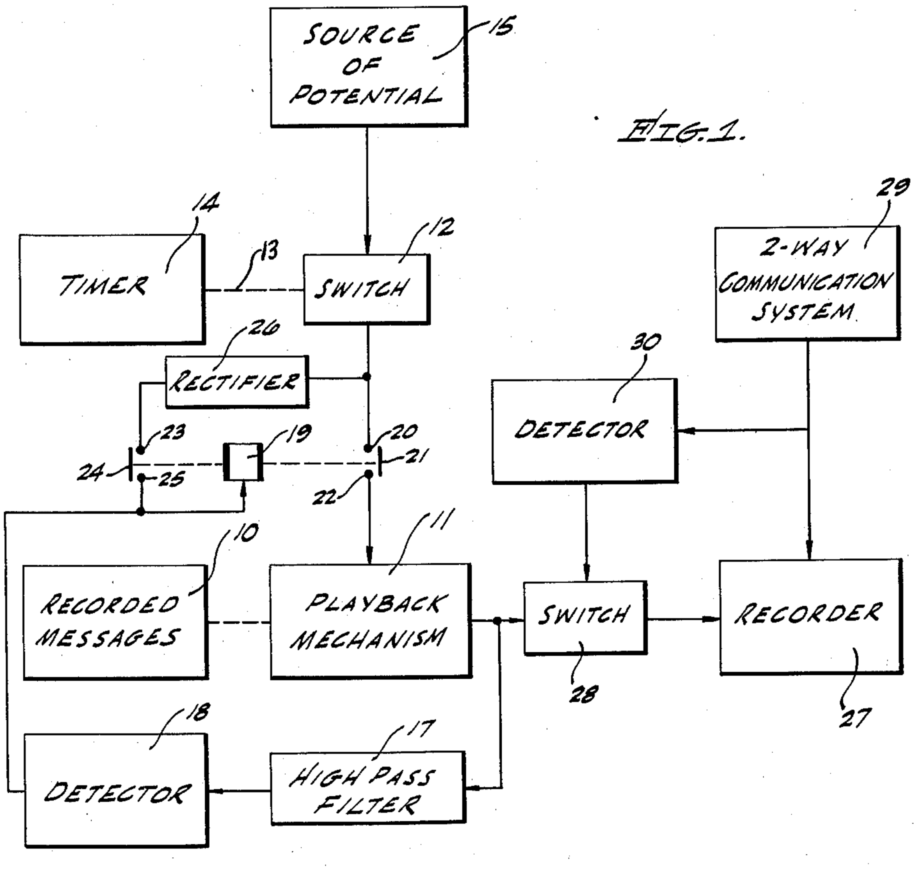

The novel features which are believed to be characteristic of the invention, both as to its organization and method of operation, together with the further objects and advantages thereof, will be better understood from the following description considered in connection with the accompanying drawing, in which: Fig. 1 is a block diagram of a system employing the principles of the present invention and Fig. 2 is a graph showing the arrangement of the voice-messages and the synchronizing signals in the recorded messages of Fig. 1.

Referring now to the drawing, a recording 10 of voice messages stating predetermined times is fed to a playback mechanism 11, which is adapted to read out the voice messages from the recording 10 to produce an electrical output signal representative of the voice messages. The recording 10 may be made on a standard magnetic tape, wire or other suitable medium and the playback mechanism may be any of well known types that is suitable for reading out the signal stored on the particular recording medium used. A switch 12 couples the playback mechanism 11 to a source of potential or power 15 that actuates the playback mechanism in accordance with the rotational position of a shaft 13 of a timer 14, which is connected to the switch 12. The switch 12 and timer 14 may be any of well known types. For example, the switch 12 may be a rotary switch with the moving arm connected to the shaft 13 of the timer 14. The timer 14 may consist of a synchronous motor and a suitable gear box with the rotational position of the shaft 13 being indicative of the time. This arrangement is similar to an ordinary electric clock. The rotating shaft 13 of the timer 14 actuates the switch 12, which in turn couples the source of power or energizing potential 15 to the playback mechanism 11 to actuate the playback mechanism in a well known manner. Since the shaft 13 is continually rotating, the operation of the switch 12 is periodic and hence the playback mechanism 11 is periodically started and stopped so that the voiced time messages recorded on the record 10 are fed into the playback mechanism 11 at fixed predetermined time intervals. These time intervals are so chosen so that the voice-time messages read out of the record 10 correspond to the real time.

Figure 2:
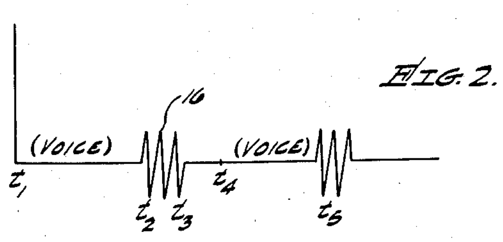

To synchronize the operation of the timer 14 and the playback mechanism 11 high frequency synchronizing signals 16 are incorporated on the recording 10 between the voiced time messages as may be seen in Fig. 2. The output signal from the playback mechanism 11 is fed to a high pass filter 17 which is arranged to pass only the high frequency signals 16. The high frequency signals 16 are then fed to a detector 18 which rectifies the high frequency signals and produces a direct current output signal which is fed to a relay 19. The output signal from the detector 18 energizes the relay 19 and causes it to open its normally closed contacts 20, 21 and 22 and close its normally open contacts 23, 24 and 25. The contacts 20, 22, 23 and 25 are fixed and the contacts 21 and 24 are movable. The movable contacts 21 and 24 are shown in their open position in the drawing. However, the movable contact 21 is normally closed and the movable contact 24 is normally open when the relay 19 is not energized. The output signal from the detector 18 thus energizes the relay 19 which opens contacts 20–22, thus disconnecting power from playback mechanism 11. When relay 19 is energized it also closes contacts 23–25, thus connecting a direct current voltage from rectifier 26 to relay 19 and hence holding it closed. Rectifier 26 receives its input power through switch 12 so that when switch 12 opens the relay 19 is deenergized, and the system is ready for a new cycle of operation.

Assume that at time $t_1$ in Fig. 2 the timer 14 has just closed the switch 12 which connects the playback mechanism 11 to the source of operating potential 15. During interval between $t_1$ and $t_2$ voice messages are read from recording 10 by playback 11. During interval between $t_2$ and $t_3$ synchronizing signals 16 are read from recording 10 by playback 11, and relay 19 closes and locks in through contacts 23–25. During interval between $t_3$ and $t_4$ the timer 14 opens switch 12 so that relay 19 is deenergized and the system is ready for a new cycle of operation.

The output signal from the playback mechanism 11 is also coupled to a suitable recorder 24 which may, for example, be a magnetic tape recorder, through a switch 28. The recorder 27 is continuously operating and is coupled to a two-way communication system 29, which is arranged to transmit and receive signals that may be indicative of a conversation so that the recorder 27 continuously records the transmitted and received or conversation signals. A detector 30 is also coupled to the two-way communication system for sensing the conversation signals and is connected to the switch 28 for controlling the switch 28 in accordance with the transmitted and received or conversation signals present in the two-way communication system 29. The detector 30 and switch 28 are arranged so that the switch 28 is closed to pass signals from the playback mechanism 11 to the recorder 27 only when no conversation is taking place on the two-way communication system 29. In other words, the switch 28 is normally closed to pass voice-time signals to the recorder 27 and is opened when the detector senses conversation signals from the two-way communication system and translates the detected signals to the switch 28. In this manner voice-time messages are recorded in the recorder 27 only when the recorder 27 is not recording conversation signals. Thus, there is no possibility that the voice-time messages will interfere or obscure any of the conversation signals present in the communication system. To prevent the recording of the synchronizing signals 16 on the recorder 27 the frequency of the signals 16 may be chosen to be higher than the highest frequency to which the recorder 27 will respond or if desired a filter may be placed between the playback mechanism 11 and the recorder 27 to filter out the frequency signal 16 in a well known manner.

It should be understood that, while the two-way communication system has been described as in connection with a radio telephone conversation, the system could also be employed in apparatus for recording other intelligence signals that are indicative of current events such as test measurements, etc.

There has thus been disclosed a system and apparatus for recording voice-time messages alternately with the recording of messages representative of pre-selected current events on a reproducible sound record to facilitate the identification of the time of occurrence of the events, or any portion thereof.

We claim:

1. In a recording system the combination which comprises a recording of voice messages stating predetermined times, playback means coupled to said recording for reading out said messages at preselected times which correspond to the times stated in the voice messages, recording means for recording preselected signals, means for applying the preselected signals to said recording means, means under the control of the preselected signals for connecting said playback means to said recording means in the absence of said preselected signals whereby the voice-time messages will be recorded by said recording means only when the recording means is not recording the preselected signals.

2. In a recording system the combination which comprises a recording of voice messages stating predetermined times, a playback mechanism coupled to said recording, means including a timer connected to said playback mechanism for periodically actuating said playback mechanism, a recorder for recording audio signals, a source of audio signals coupled to said recorder, switching means under the control of said source for connecting said playback mechanism to said recorder in the absence of said audio signals.

3. A system for superimposing voice-time messages on conversation recordings comprising a recording of voice messages stating predetermined times, a playback mechanism coupled to said recording of voice messages for reading out said messages to produce an output signal representative of the voice messages, means including a timer connected to said playback mechanism for actuating said mechanism at preselected times so that the voice messages read out by said playback mechanism correspond to the real time, a two-way communication system for receiving and transmitting audio signals, a recorder connected to said communication system for recording the transmitted and received signals upon a reproducible sound record, and means connected between said playback mechanism and said recorder and responsive to the transmitted and received signals for translating the time signals developed in the playback mechanism to the recorder in the absence of the transmitted or received signals.

4. A system for superimposing voice-time messages on signal recordings comprising, a recording of voice messages stating predetermined times, means including a playback mechanism for reading out said messages at preselected times so that the voice-time messages read out of the record correspond to real time, recording means for recording signals, means for applying input signals to said recording means, detecting means coupled to last-named means for sensing said input signals, gating means under the control of said detecting means for applying the signals developed in said playback mechanism to said recording means in the absence of said input signals.

5. A system for superimposing voice-time messages on conversation recordings comprising, a recording of voice messages stating predetermined times, a playback mechanism coupled to said recording of voiced messages for reading out said voice messages to produce an output signal representative of the voice messages, a timer including an output shaft arranged to rotate, the rotational position of said shaft being indicative of real time, a switch coupled to said shaft and connected between a source of electric energizing potential and said playback mechanism for actuating said playback mechanism at preselected times so that the voice-time message read out of said recording corresponds to real time, a communication system for receiving and transmitting audio signals, a detector connected to said communication system for sensing the signals that are transmitted and received by the communication system, a recorder connected to the communication system for recording the transmitted and received signals upon a reproducible sound record and a switch under the control of the detector and connected between the playback mechanism and the recorder for translating the signals developed in the playback mechanism to the recorder when no signals are being transmitted or received, whereby the reproducible sound record will have voice-time messages recorded thereon when the communication system is not transmitting or receiving.

6. A system for superimposing voice-time messages on signal recordings comprising voice messages stating predetermined times recorded on a recording medium, synchronizing signals recorded between each of the voice messages on the recording medium, a playback mechanism coupled to the recording medium and adapted to read out the signals recorded thereon, a source of energizing potential, switching means connected between the source of potential and the playback mechanism, timing means coupled to the switching means for connecting the playback mechanism to the source of potential at predetermined times to actuate the playback mechanism so that the voice messages read out of the playback mechanism correspond to real time, means responsive to the synchronizing signals for disconnecting the playback mechanism from the source of potential after each voice message has been read out by the playback mechanism to synchronize the operation of the timing means and the playback mechanism, a source of intelligence signals, a recorder connected to the source of intelligence signals, and means connected between the playback mechanism and the recorder and responsive to the intelligence signals for translating the signals read out by the playback mechanism representative of the voice messages to the recorder in the absence of the intelligence signals.

7. A system as defined in claim 6 wherein the synchronizing signals are prevented by means of frequency filtering from being recorded by the recorder.

References Cited in the file of this patent

UNITED STATES PATENTS

| | | |
|---|---|---|
| 1,852,727 | Horst | Apr. 5, 1932 |
| 2,499,587 | Kellogg | Mar. 7, 1950 |
| 2,499,603 | Mueller | Mar. 7, 1950 |
| 2,680,150 | Weld | June 1, 1954 |